2 Sheets—Sheet 1.
W. L. HUNT.
Theater Appliance.
No. 214,663. Patented April 22, 1879.
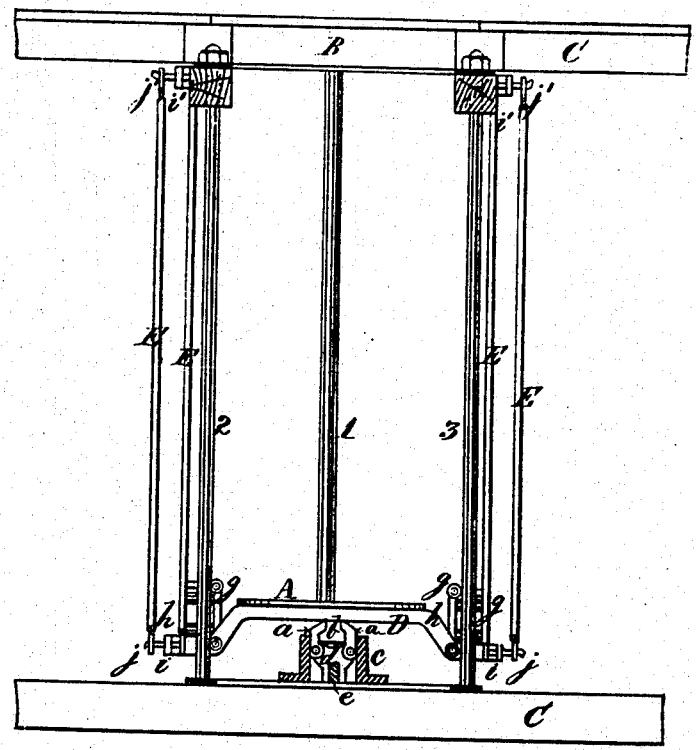
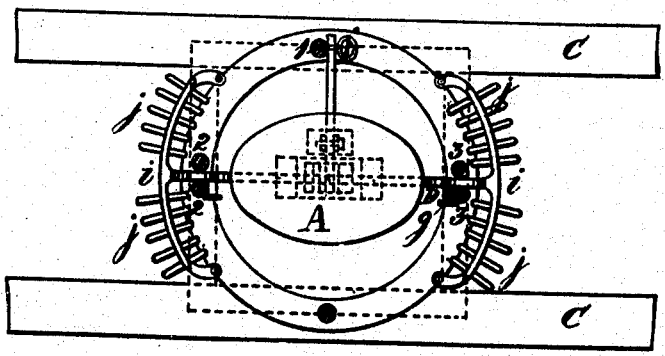

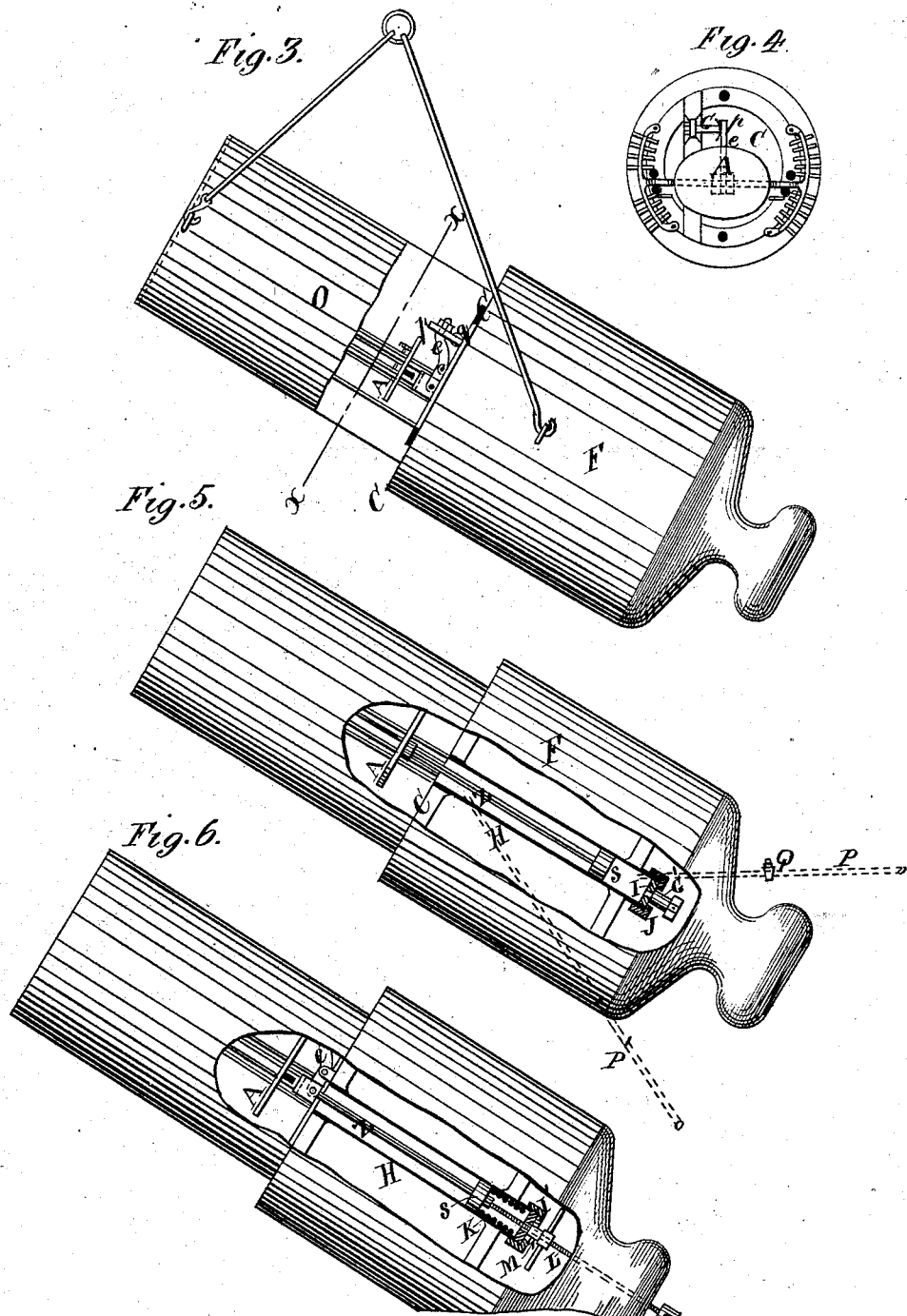
W. L. HUNT.
Theater Appliance.
No. 214,663. Patented April 22, 1879.

UNITED STATES PATENT OFFICE.

WILLIAM L. HUNT, OF WESTMINSTER, ENGLAND.

IMPROVEMENT IN THEATER APPLIANCES.

Specification forming part of Letters Patent No. 214,663, dated April 22, 1879; application filed January 24, 1879; patented in England, December 18, 1875.

*To all whom it may concern:*

Be it known that I, WILLIAM LEONARD HUNT, of Westminster, in the county of Middlesex, England, have invented an Improvement in Theater Appliances; and I do hereby declare that the following is a full and exact description thereof, reference being had to the figures on the accompanying drawings, and to the letters marked thereon.

This invention relates to the adaptation of the invention for which Letters Patent of the United States were granted June 13, 1871, No. 115,837, so as to use explosives as a means for releasing the catch, the present invention having been patented to me in England, dated December 18, 1875, No. 4,404.

My invention consists in combining the frame-work, inner platform, and springs of the said patent of June, 1871, or other platform and springs operating the same, with the cylindrical casing or chamber of a cannon or gun, and with a tube or cylinder containing a sufficient quantity of powder, and placed in such a manner and position with relation to a catch or lock for retaining the inner platform and extended springs that when the powder is ignited or discharged by means of a match, percussion, or electricity, the catch or lock will be opened, so as to release the platform and springs, which will then propel the performer from the cannon, and at the same time give a loud report, thereby creating a belief that a real cannon is employed, and that the motive power is powder.

I will first describe, for illustration, the apparatus of June, 1871, as shown in Figure 1, which represents a sectional elevation, and in Fig. 2 a plan.

A is the inner platform, on which stands the gymnast or other performer to be projected upward through the stage trap or opening B. This platform is shown in its lowest position ready for action, and there locked by two hinged jaws or levers, *a a*, the hooked ends of which gripe or take into two beveled recesses or slots formed on the sides of a stud or head, *b*, attached to the under side of the platform A. When in this position they are prevented from spreading apart on their hinges by the sides of an open socket-piece, *c*, secured vertically to the lower part of the frame-work C. The jaws or levers *a a* are hinged to the arms of a Y or other shaped connecting-piece, *d*, which is connected at its lower end with the short arm of a lever, *e*, the long arm of which passes out to the side of the frame-work C, where it rests (when the platform A is in its lowest position, as shown) upon a rod or bolt, *f*, which is inserted into the upright standard I of the frame-work C, and is formed with a handle for removing it therefrom when required.

The platform A is secured to or carried at its under side by a bar, D, each end of which passes between the two upright pillars or rods 22 and 33, respectively, on each side of the frame-work C, where it is provided with rollers *g g*, mounted in suitable frames *h h*, and working against the said rods 22 and 33, so as to act as guides to the bar D and platform A in their ascent; or these guides may be in the form of sockets, formed at the ends of the bar D, and sliding over the said tubes, or they may be arranged in any other manner that may be found most suitable.

On the upper ends of the pillars or rods 22 and 33 are rubber or other buffers, for deadening the shock occasioned by the rapid ascent of the platform A, as hereinafter described.

The bar D terminates at each end outside the upright pillars or rods 22 and 33 with a curved shape bar or circular ring, *i*, carrying pins or hooks *j j*, immediately over which are similar curved bars or rings *i' i'*, secured to the under side of the top portion of the frame-work C, and carrying pins or hooks *j' j'*. Between the pins or hooks *j* and *j'* the india-rubber or other springs E are stretched or extended, and the whole apparatus is ready for use.

The gymnast or other performer being stationed on the platform A, and it being desired to project him or her upward, the bolt *f* is withdrawn by means of its handle from the upright standard I of the frame-work C, and from underneath the long arm of lever *e*, which being now free to move, the tension of the extended springs E, acting upon the stud or head *b* on the under side of the platform A, pulls up the jaws or levers *a a* out of the socket *c*, and the said levers spreading open on their hinges release the platform A, which instantly flies upward in obedience to the action of the springs E, and projects the gymnast or other performer, as desired.

I will now proceed to describe my improvement, in which Fig. 3 is a side sectional elevation of the apparatus above described, adapted to a cannon or gun, according to the second part of my invention, and Fig. 4 a section on line $x\ x$ in Fig. 3.

In this arrangement the entire apparatus, which is similar to that described in Figs. 1 and 2, (except that the locking-bolt $f$ is dispensed with,) is inclosed in the cylindrical chamber or casing $o$ of the cannon or gun F, which is suspended from the roof or other convenient part of the place of exhibition at any desired angle by rods or chains, as shown.

On the end of the long arm of lever $e$, as seen in Fig. 1, is hinged a short arm, $p$, which, when the platform A is in its lowest position, as shown, is turned down vertically with the lever $e$, so that its end bears hard upon the lower portion of the frame-work C, thereby preventing the tension of the springs E from forcing down the long arm of lever $e$, and so releasing the platform A. The lower end of the arm $p$ is flattened out or enlarged, so as to cover and be in contact with the mouth of a short tube or cylinder, G, which is carried by a bracket secured to the lower portion of the frame-work C and charged with powder; or, if preferred, in lieu of flattening or enlarging the end of the arm $p$, a cup-shaped piece may be fixed thereto, so as to fit over the mouth of the tube or cylinder G.

A gymnast or other performer having assumed an inclined position inside the chamber $o$ of the cannon or gun F, with his or her feet bearing against the inner platform, A, and it being desired to project him or her from the gun, the powder contained in the tube or cylinder G is ignited by a match or fuse, or by percussion or electricity, and the arm $p$ of the lever $e$ being driven away from the mouth of the tube or cylinder G by the gases generated releases the long arm of lever $e$ and platform A, which instantly flies outward toward the mouth of the cannon or gun F, and the gymnast or other performer is thereby projected from the cannon into the air, as desired.

In case the powder does not act, owing to dampness or other unexplained cause, provision is made for igniting it by means of electricity acting along wires in connection with the tube or cylinder G, a spark being thereby caused, which ignites a quantity of fine dry powder in communication with that contained in the tube or cylinder G, and which is rapidly discharged thereby.

It will be understood that the particular ejecting apparatus is immaterial, and also that various kinds of catches may be employed, the essential feature of the invention being the releasing of the platform by the explosion of powder or any of its equivalents.

I claim—

The combination of a cylinder open at one end to form the mouth, a platform movable in said cylinder to and from the mouth, a spring or springs beneath said platform and acting thereon to force the platform toward the mouth, a latch or catching mechanism to hold the platform down against the pressure of the springs, and a chamber in the relation to the catching mechanism as described, and so that an explosion in said chamber will release the platform from the catching mechanism, all substantially as described.

WILLIAM LEONARD HUNT.

Witnesses:
   E. T. HUGHES,
      123 *Chancery Lane, London.*
   E. A. HILL,
      123 *Chancery Lane, London.*